United States Patent [19]

Mekosh, Jr.

[11] 4,372,620
[45] Feb. 8, 1983

[54] ANTI-LOCKING BRAKE SYSTEM FOR A VEHICLE

[75] Inventor: George Mekosh, Jr., Warrington, Pa.

[73] Assignee: The Budd Company, Troy, Mich.

[21] Appl. No.: 231,458

[22] Filed: Feb. 4, 1981

[51] Int. Cl.³ ............................................. B60T 8/02
[52] U.S. Cl. ............................... 303/99; 188/181 A; 303/61; 303/118
[58] Field of Search ............ 303/113, 114, 115, 116, 303/117, 118, 119, 61–63, 68–69, 24 A, 99, 7, 9, 13, 40, 28–30; 188/181 A; 137/38

[56] References Cited

U.S. PATENT DOCUMENTS

| | | | |
|---|---|---|---|
| 3,637,264 | 1/1972 | Leiber et al. | 303/119 X |
| 3,645,584 | 2/1972 | Leiber et al. | 303/119 X |
| 3,731,979 | 5/1973 | Mikaila | 303/61 X |
| 3,743,362 | 7/1973 | Neisch | 303/118 |
| 3,768,374 | 10/1973 | Ito et al. | 303/99 X |
| 4,099,793 | 7/1978 | Iio | 303/119 X |
| 4,229,051 | 10/1980 | Mekosh, Jr. et al. | 303/99 |

Primary Examiner—Douglas C. Butler
Attorney, Agent, or Firm—Edward M. Farrell; Herman Foster; Thomas I. Davenport

[57] ABSTRACT

An anti-locking system controls the service braking pressure for controlling the application of pneumatic braking pressure applied to a wheel vehicle. A valve responsive to the speed of the wheel causes actuation of a fluid pulse generator to generate fluid pulses of predetermined amplitudes and frequency to switch the braking pressure on and off when the vehicle wheel becomes locked.

8 Claims, 2 Drawing Figures

ANTI-LOCKING BRAKE SYSTEM FOR A VEHICLE

BACKGROUND OF THE INVENTION

Brake control devices for preventing locking or sliding of vehicle wheels when the brakes are applied by an operator are well known. Such devices have included means for automatically controlling the release and reapplication of the wheel brake. Such "anti-lock" devices have been used in automotive vehicles such as trucks, trailers and buses, as well as in railway cars.

One such anti-locking system relating to trailers is described in U.S. Pat. No. 4,229,051 issued Oct. 21, 1980. A copending application assigned to the same assignee as the present invention, which illustrates and describes a system and sensing valves of the types which may be used in connection with the present invention is "Anti-Locking Mechanism", Pat. No. 4,281,881 issued Aug. 4, 1981.

While the systems described in the aforementioned patent and application have proven satisfactory, the rates at which the sensing valves connect and disconnect the braking pressures during lock up is sometimes not consistent. It is desirable in some cases to control the frequency at which the brakes are switched on and off during "lock up" conditions. Also, it is desirable that the pressures controlling such on and off switching of brakes during "lock up" be relatively constant.

OBJECTS OF THE INVENTION

It is an object of this invention to provide an anti-lock system for a vehicle wheel in which improved means are provided for releasing the brake on the wheel during a lock-up condition.

It is a further object of this invention to provide improved means for switching on and off the braking of the wheels of a vehicle during a lock up condition.

It is still a further object of this invention to provide a novel means for switching on and off the braking of the wheels of a vehicle at relatively uniform rates during skid conditions.

BRIEF SUMMARY OF THE INVENTION

In accordance with the present invention, a source of braking pressure is responsive to the application of service pressure to apply pressure to the brake of a vehicle wheel. A valve, adapted to be open or closed, is connected between the source of service pressure and a variable control means which controls the amount of braking pressure applied. A wheel speed sensor comprising an on-off valve is connected to respond to the speed of the vehicle. The wheel sensor opens when the deceleration of the vehicle wheel exceeds a predetermined limit to produce a series of fixed amplitude fluidic pulses to switch on and off the valve leading from the service pressure to the variable control valve thereby switching on and off the braking pressure from being applied.

Other objects and advantages of the present invention will be apparent and suggest themselves to those skilled in the art, from a reading of the following specification and claims, taken in conjunction with the accompanying drawings in which:

FIG. 1 is a schematic representative of a braking system for a trailer, embodying the present invention; and FIG. 2 is a portion of the system illustrated in FIG. 1, partly in block diagram form, along with a mechanical anti-lock system, in accordance with the present invention.

DESCRIPTION OF THE PREFERRED EMBODIMENTS

The components found in conventional systems will be described briefly for a better understanding of the invention. Such a system is described in detail in the aforementioned patent.

As is well known, there are primary and emergency pressure tank systems included in most trailers. The emergency tank system is charged by air pressure from the tractor's system through an emergency supply line.

When the air pressure from the tractor reaches a valve, generally referred to as a ratio relay valve, it charges the emergency tank, various hoses and the emergency side of the mechanical spring brakes. It also charges the primary tank.

When the pressure in the emergency tank reaches a predetermined level, such as 60 psi, the spring brakes begin to react and a shuttle valve in the ratio relay valve permits the air pressure to charge a primary tank. Generally, the spring brakes are completely released at a higher pressure, for example, 90 psi.

Application of the parking brake or loss in the emergency line pressure will generally cause the pressure of the ratio relay valve to be relieved, and the air pressure is exhausted from the emergency brake hoses and spring brakes. When the pressure falls below 60 psi, the mechanical spring brakes are automatically applied.

When the spring brakes are released and service brakes are applied by an operator in the tractor, air pressure will flow from a source within the tractor through the service line into the service system of the trailer.

The service pressure is applied to a relay valve which permits the air pressure in the primary tank to be applied to the service brakes.

Release of the service brakes causes the air pressure in the service line to be exhausted causing the relay valve to release the delivery air pressure from the service sides of the brake chambers to release the service brakes.

Figure 1:
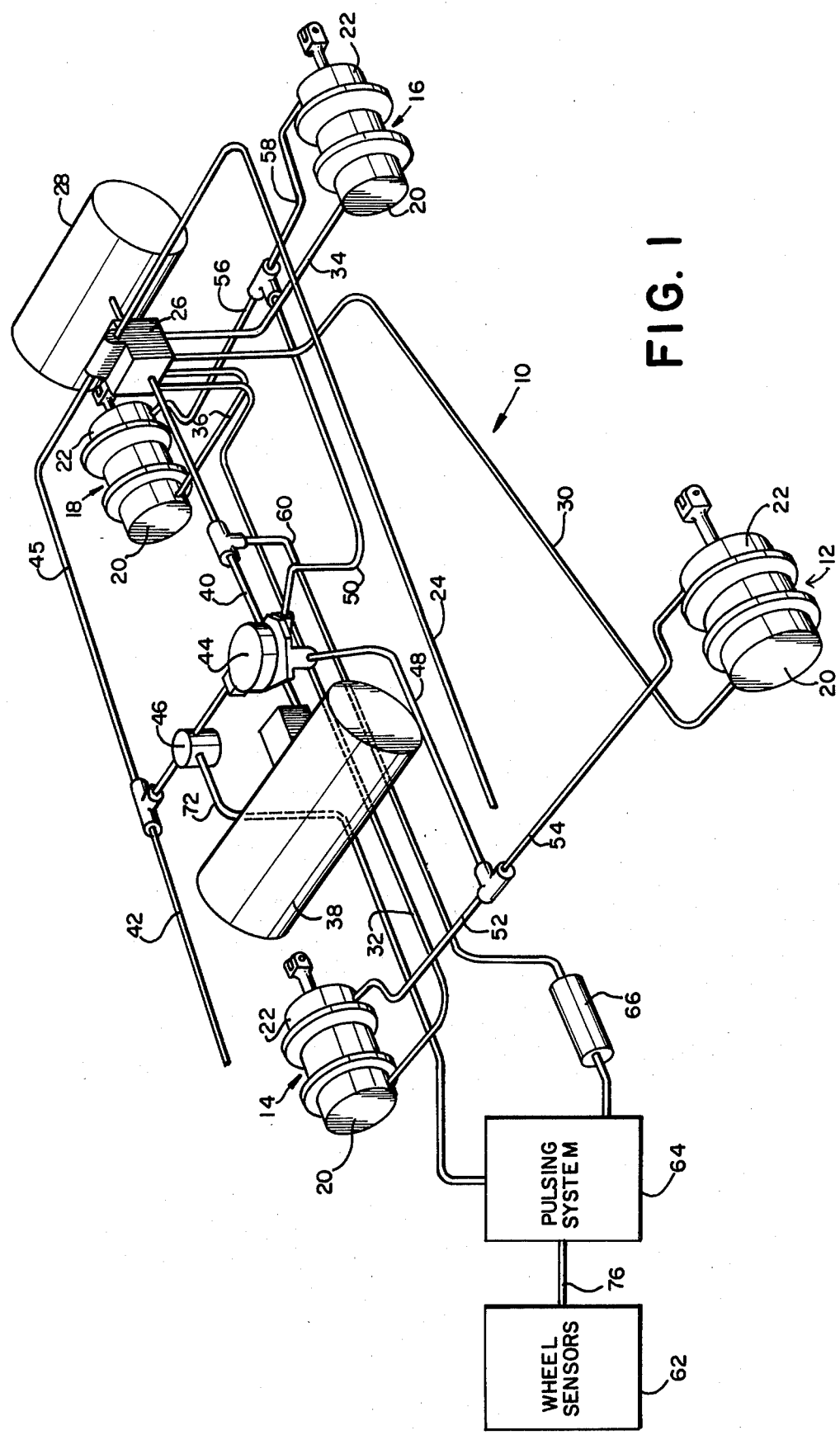

Referring particularly to FIG. 1, a brake system 10 of a two axle trailer includes a pair of front brake assemblies 12 and 14 and a pair of rear brake assemblies 16 and 18. All the brake assemblies illustrated may be of the conventional type. For example, each of the assemblies include a parking brake chamber 20 and a service brake chamber 22.

The main air pressure from the tractor is applied to an emergency or supply line 24. As air pressure reaches a ratio relay valve 26, it is directed to charge an emergency tank 28 and to hoses 30, 32, 34 and 36 which are connected to the parking brake chambers 20 of the brake assemblies 12, 14, 16 and 18, respectively. With no pressure in the parking brake line or hoses 30, 32, 34 and 36, the brakes are mechanically applied and the trailer cannot be moved.

When the pressure in the emergency tank 28 and hoses 30, 32, 34 and 36 reach a predetermined pressure, for example, 60 psi, the parking brake springs (not illustrated) in the parking brake chambers 20 begin to release the brakes. As the pressure reaches 60 psi, a shuttle valve in the ratio relay valve 26 allows air pressure to charge a primary tank 38 through a line 40. The pressure in the tank 28 continues to raise to about 90 psi, for example. When the pressure in the primary tank 38 reaches 90 psi, the spring brakes are fully taken off and the trailer may be moved. As previously mentioned, application of the parking brake or loss in the supply line pressure will cause the pressure from the relay valve 26 to be relieved to thereby exhaust the air pressure from the parking brake chambers and thus mechanically reapply the spring brakes.

With the spring brakes released, application of the service brake, resulting from an operation inside the tractor will cause air pressure to be applied into the system from the tractor to the trailer through a service line 42. The service line 42 is normally at zero pressure until the service brakes are applied.

When the service brakes are applied, the relatively large volume of the primary tank 38 is applied to the service chambers 22 of the brake assemblies 12, 14, 16 and 18 through a relay valve 44. The service pressure is applied to the relay valve 44 through slave valve 46. The slave valve 46 is held open during normal operation by pressure and closes under a lock-up condition of the wheels of the vehicle, as will be subsequently described in greater detail. One side of the ratio relay valve 26 leading to a line 45 serves as an anti-compounder. This is not related to the invention, but anti-compounding generally permits service pressure from adding to the supply pressure and prevents possible rupture of other components involved.

Pressure from a pilot line, to be described, normally maintains the slave valve 46 open. Greater service pressure which is applied by the operator to the brake pedal, for example, will cause more pressure to pass from the primary tank 38 through the relay valve 44 to the service brakes 22 through lines 48, 50, 52, 54, 56 and 58. Basically, the relay valve 44 may include a diaphragm disposed to receive pressure from the service line 42. Greater pressure on this diaphragm permits greater pressure to flow through the valve 44 from the primary tank 38 to the service brake chambers 22. When the driver or operator removes his foot from the pedal or other service pressure control mechanism, the pressure in the service line 42 drops and the pressure against the diaphragm in the relay valve 44 is released to prevent pressure from passing from the primary tank 38 to the service brake chambers 22.

The anti-lock mechanism involving the present invention includes means for utilizing fluid pulses of predetermined amplitudes and rate to open and close for short time periods the normally open slave valve 46 to prevent pressure in the service line 42 from reaching the relay valve 44. With no service pressure applied to the relay valve 44, the pressure from the primary tank 38 to the service brake chambers 22 will be blocked. As a result, no pressure will be applied through the lines 48, 50, 52, 54, 56 and 58 to the service brake chambers 22 of the brake assemblies 12, 14, 16 and 18.

The slave valve 46 is normally held open by what will be referred to hereinafter as pilot pressure at line 60 which is applied to a fluidic pulser circuit 64 through a direct path and through an orifice device 66. The pressure in line 60 is connected to anit-lock device or wheel sensors, generally indicated by a block 62, to be described in connection with subsequent figures. The line 60 is connected to the sensors 62 through the fluidic pulser circuit 64 which reacts to the sensors during lock-up to produce fluidic pulses, the details of which are shown and described in connection with FIG. 2.

The anit-lock devices or valves are connected to rotate with the wheels of a trailer, for example. Pressure to the lines 60 and 72 is supplied through the valve 26 from the emergency tank 28. The conduit 72 is connected to the slave valve 46 to provide pressure and to maintain it open.

The wheel sensors 62, which may be inertia valves are connected through the pulser 64 and line 72 to the slave valve 46 and are normally closed during normal braking operation. However, during "lock up" one or more of the wheel sensors open and the pressure which keeps the slave valve open is relieved causing the slave valve 46 to close and prevent the service from being applied from the service line 42 to the relay valve 44. Under these circumstances, braking pressure as applied from the primary tank 38 to the service brake chambers 22 is caused to drop off and escape through the appropriate exhaust ports in the relay valve 44 (not illustrated). After unlocking of the wheels occur, the inertia valves or sensors (in block 64) closes and normal braking operations may be resumed.

The inertia valves or sensors may be considered as valves which, when closed, maintain the pilot pressure in line 72 and allows the slave valve 46 to assume its normally open position. When the inertia sensors or valves open, the pilot pressure drops and the slave valve 46 closes. Closing of the slave valve 46 also permits any service pressure accumulated in the relay valve 44 to exhaust by ports not illustrated. When the wheel of the vehicle comes back up to speed, the inertia sensors or valves close permitting the pilot lines to repressurize. When the pilot lines are repressurized to about 40 psi, for example, the slave valve 46 opens to allow service pressure to resume flowing into the relay valve 44 thus permitting a reapplication of pressure from primary tank 38 to service brake chambers 22.

Figure 2:
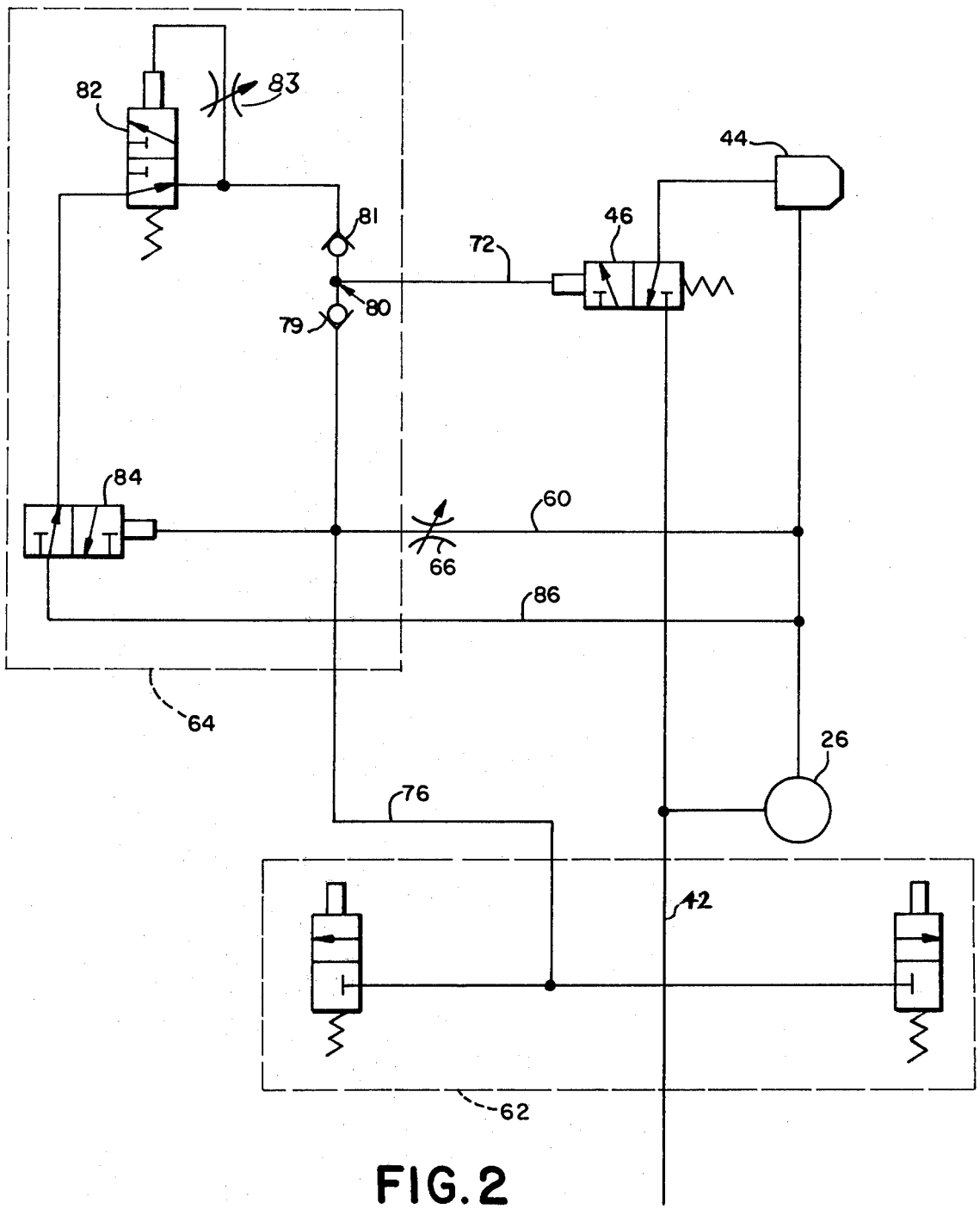

Referring to FIG. 2, the wheel sensors 62, which include switching means adapted to open and close, are normally closed when the vehicle, with which they are associated is moving during normal operating conditions and no brakes are being applied. Under these conditions, the pressure is built up in the sensor line 76 by pressure from line 60 passing through the device 66 which has a pressure limiting orifice therein. During normal travel, there would, for example, be a pressure built up approximately 40 psi that fill the lines from the sensors 62 up to a fluid an EXCLUSIVE OR element 80.

The OR element 80 comprises a two-way check valve including one way check valves 79 and 81. The direction of fluid flow through the OR gate is dependent upon the side of the valve which has the lower pressure. For instance, because the wheel sensors 62 are closed, there is pressure built up in the line 76 which causes fluid pressure to pass through the valve 79 of the OR element, through the line 72 to the valve 46. Pressure will not pass through the valve 81 to a frequency generator valve 82 because this check valve is closed.

When the driver of the vehicle applies the signal pressure or pedal pressure to the service line 42, pressure passes through the slave valve 46 and into the valve 44 to cause normal pressure to be applied to the brakes. When the driver releases his foot from the brake pedal, pressure at the line 42 drops and the slave valve 46 remains open.

In the anti-skid system of the type described in the aforementioned patent, when the normally closed wheel sensors 62 sense a skid, the associated valves or wheel sensors open. This causes a pressure drop in the line 76 leading to the valve 79 of the OR element 80 and the normally closed slave valve 46. Pressure in the line 76 exhausting at the wheel sensors 62 and closing of the slave valve 46 has the same effect as if the operator has released the brake pedal and no pressure to the brakes will be applied from the valve 44 and the wheels of the vehicle will spin up.

As the wheels spin up, the wheel sensors 62 close and the pressure will build up again in the line 76 to about 40 psi. The pressure will then again open the normally closed slave valve 46 and reapply pressure to valve 44 to permit brake pressure to be applied. Basically, the system thus far described is similar to the system of the aforementioned patent. The present invention refers to the addition of a fluid pulsing system to produce fluid pulses to control the switching on and off of the braking operating during lock up.

When the wheel sensor 62 senses skid conditions, they open. This causes a pressure drop in the line 76 up to the slave valve 46. However, with the pulsing system added, this pressure drop also reduces the pressure on the normally open NOT element valve 84. Thus, when the wheel sensors 62 open as a result of a skid condition, the pressure drops at the slave valve 46 and at the same time causes a pressure drop at the normally open NOT element valve.

When the normally open NOT element closes, pressure from the line 86 passes through the NOT element 84 into the frequency generator valve 82. Such frequency or impulse generators are known and commercially available. When the frequency generator 82 is pressurized, it creates pressure pulses internally which pass through valve 81 of the OR element 80. The reason for this is that the pressure on the valve 70 of the OR element 80 is reduced because the wheel sensors are open to drop the pressure in line 76.

When pressure pulses are developed by the frequency generator 82, they flow through the OR element 80 into the top of the slave valve 46 and pulses this valve on and off. The pressure pulses through the valve 81 cannot flow down stream to the wheel sensors 62 because the OR element 80 acts as a two-way check valve with the valve 79 blocking the pulses. The OR element permits pressure to flow in one or the other direction and the fluid cannot flow in both directions at the same time.

The pulsing from the frequency generator 82 continues until the wheel sensors 62 are closed for a sufficient period of time to cause the system to revert back to its original state. This would take place, for example, when the wheel sensors 62 are closed after the skid or lock up of the wheels is over. When normally non-braking operation is resumed, the 40 psi pressure flowing through the orifice device 66, at a controlled rate, will again build up at the normally opened NOT element 84 and in the line 76 leading to the wheel sensors 62. The main condition which turns off the pulsing system is the build up of pressure at the normally open NOT element 84. This prevents the air flowing from the line 60 to the frequency generator 82.

When the wheel sensors 62 are closed, there is 40 psi pressure in the lines 76 and 72. The 40 psi pressure can flow through the OR element 80 toward the slave valve 46 but the pressure cannot flow through the OR element 80 toward the frequency generator 82 because of its internal design of the generator. Consequently when the wheel sensors 62 are closed, the normally closed slave valve 44 is open and the normally open NOT element 84 is closed.

When the normally open NOT element is closed, pressure cannot flow from the line 86 into the frequency generator. When one of the wheel sensors open and senses skid, the pressure in the line 76 drops to zero. This initially causes slave valve 46 to close because the pressure on the slave valve 46 reduces. At the same time, pressure drops off at the normally open NOT element 84. When the pressure on top of the normally open NOT element 84 reduces, this valve shuttles and pressure from a second pressure source, i.e., the line 86, flows through the NOT element 84 and into the frequency generator 82. When the frequency generator 82 is pressurized internally because of this design, it generates fluidic pulses. The frequency generator 82 may include a needle valve 83 which may be used to vary the frequency rate of the generator 82. Once the frequency generator is pressurized, it generates pressure pulses through the valve 81 of OR element 80. These pulses will flow through the OR element 80 to the slave valve 46. The pulses open and close will stop and start the service air from flowing into the valve 44.

The various air logic control devices are well known and available commercially. One company manufacturing such control devices is Miller Fluid Power, 7N015 York Road, Bensenville, Illinois, 60106. This and other companies make valves which operate as OR and NOT elements as well as frequency fluid pulse generators.

What is claimed is:

1. In combination with a source of service pressure for application to a brake to decelerate a vehicle,
    (a) a control valve disposed to open and close, connected between said source of service pressure and said brake;
    (b) a first source of pressure connected to maintain said control valve open to permit said service pressure to be applied to said brake;
    (c) a fluid pulse generator for generating fluid pulses normally maintained inoperative by said first source of pressure;
    (d) a wheel sensor responsive to the rotation of said wheel;
    (e) said wheel sensor including normally closed switching means to maintain said pressure at said first source and responsive to deceleration of said wheel in excess of a predetermined rate to open and exhaust said pressure at said first source;
    (f) a fluid gate valve connected to said fluid pulse generator;
    (g) a second source of pressure connected to said fluid gate valve to apply fluid pressure therethrough to said fluid pulse generator when said first source of pressure is below a predetermined level to activate said fluid pulse generator to cause said fluid pulses to be applied to said control valve, and
    (h) means for applying said fluid pulses to switch said control valve on and off to permit said service pressure to be applied to said brake to be switched on and off when said fluid pulses are being generated.

2. A combination as set forth in claim 1 wherein a fluid EXCLUSIVE OR gate valve is disposed to pass fluid pressure to said control valve either from said first source of pressure or from said fluid pulse generator.

3. A combination as set forth in claim 2 wherein said EXCLUSIVE OR gate valve includes a pair of unidirectional fluid valves.

4. In combination with a source of service pressure for application to a brake to decelerate a vehicle,
   (a) a control valve disposed to open and close, connected between said source of service pressure and said brake;
   (b) a first source of pressure connected to maintain said control valve open to permit said service pressure to be applied to said brake;
   (c) a fluid pulse generator for generating fluid pulses normally maintained inoperative by said first source of pressure;
   (d) a wheel sensor responsive to the rotation of said wheel;
   (e) said wheel sensor including normally closed switching means to maintain said pressure at said first source and responsive to deceleration of said wheel in excess of a predetermined rate to open and exhaust said pressure at said first source;
   (f) a fluid gate valve responsive to a drop in said first source of pressure to activate said fluid pulse generator to generate fluid pulses;
   (g) a second source of pressure connected to said fluid gate valve to apply fluid pressure therethrough to said fluid pulse generator when said first source of pressure is below a predetermined level;
   (h) a fluid exclusive OR gate including a pair of unidirectional valves disposed to pass fluid pressure to said control valve either from said first source of pressure or from said fluid pulse generator, one of said unidirectional valves being connected between said fluid pulse generator and said control valve and the other being connected between said first source of pressure and said control valve, and
   (i) means for applying said fluid pulses to switch said control valve on and off to permit said service pressure to be applied to said brake to be switched on and off when said fluid pulses are being generated.

5. A combination as set forth in claim 4 wherein a plurality of wheel sensors including switching means are provided to respond to rotations of a plurality of wheels on said vehicle to maintain or exhaust the pressure at said first source of pressure.

6. A combination as set forth in claim 5 wherein a main source of fluid pressure is connected to provide fluid pressure at said first and second sources of pressure, with an orifice device being connected between said main source of pressure and said first source of pressure to control the flow of the pressure therebetween.

7. A combination as set forth in claim 6 wherein the fluid pulses generated by said fluid pulse generator are of relatively constant amplitudes.

8. A combination as set forth in claim 7 wherein means are provided for varying the frequency of the fluid pulses generated by said fluid pulse generator.

* * * * *